United States Patent
Dharmaraj et al.

(10) Patent No.: US 9,776,743 B2
(45) Date of Patent: Oct. 3, 2017

(54) EXPANDABLE GRAVITY CHAMBER FOR A HABITATION MODULE THAT IS HOUSED IN AN INFLATABLE SHELL

(71) Applicant: The Boeing Company, Chicago, IL (US)

(72) Inventors: Raju Dharmaraj, League City, TX (US); Patrick A. Swartzell, Pearland, TX (US); James Michael Engle, Pearland, TX (US); Thomas L. Hoffman, Friendswood, TX (US); Travis Andrew Moseman, Dickinson, TX (US); Karl David Heiman, Houston, TX (US)

(73) Assignee: The Boeing Company, Chicago, IL (US)

( * ) Notice: Subject to any disclaimer, the term of this patent is extended or adjusted under 35 U.S.C. 154(b) by 110 days.

(21) Appl. No.: 14/992,956

(22) Filed: Jan. 11, 2016

(65) Prior Publication Data

US 2017/0197735 A1    Jul. 13, 2017

(51) Int. Cl.
| | |
|---|---|
| *B64G 1/00* | (2006.01) |
| *B64G 1/46* | (2006.01) |
| *B64G 1/60* | (2006.01) |
| *B64G 1/22* | (2006.01) |

(52) U.S. Cl.
CPC .............. *B64G 1/46* (2013.01); *B64G 1/60* (2013.01); *B64G 2001/224* (2013.01)

(58) Field of Classification Search
None
See application file for complete search history.

(56) References Cited

U.S. PATENT DOCUMENTS

| | | | | |
|---|---|---|---|---|
| 3,144,219 A | * | 8/1964 | Schnitzer | B64G 1/16 114/116 |
| 3,169,725 A | * | 2/1965 | Berglund | B64G 1/12 244/155 R |
| 3,210,026 A | * | 10/1965 | Frisch | B64G 1/12 244/159.4 |

(Continued)

FOREIGN PATENT DOCUMENTS

WO    8700142 A1    1/1987

OTHER PUBLICATIONS

European Search Report; Application 17150616.5-1754 3190054; Jun. 14, 2017.

*Primary Examiner* — Medhat Badawi
(74) *Attorney, Agent, or Firm* — Duft Bornsen & Fettig LLP

(57) ABSTRACT

A habitation module with a gravity chamber that provides an artificial gravity environment. In one embodiment, the gravity chamber includes an inner cylindrical structure, outer wall segments that are attachable to one another to form an outer cylindrical wall, and opposing side walls having support members that are extendable. The gravity chamber has a first diameter when the support members are contracted, and has a larger second diameter when the support members are extended. The gravity chamber connects to the habitation module with rotating attachment members so that the gravity chamber rotates about an axis. The habitation module also includes an inflatable shell that encompasses the gravity chamber.

20 Claims, 12 Drawing Sheets

(56) References Cited

U.S. PATENT DOCUMENTS

| | | | | |
|---|---|---|---|---|
| 3,300,162 A * | 1/1967 | Maynard | B64G 1/12 | 244/1 R |
| 3,333,788 A * | 8/1967 | Dryden | B64G 1/12 | 102/378 |
| 3,340,619 A * | 9/1967 | Bertin | B64G 7/00 | 104/138.1 |
| 3,348,352 A * | 10/1967 | Cummings | B64G 1/12 | 244/1 R |
| 3,350,002 A * | 10/1967 | Pickels | B04B 1/00 | 494/43 |
| 3,675,879 A * | 7/1972 | Fuchs | B64G 1/12 | 244/171.7 |
| 3,744,739 A * | 7/1973 | Weaver | B64G 1/646 | 244/172.4 |
| 3,749,332 A * | 7/1973 | Gray | B64G 1/46 | 244/171.7 |
| 4,057,207 A * | 11/1977 | Hogan | B64G 1/12 | 244/159.4 |
| 4,175,723 A * | 11/1979 | Shea, Jr. | B64G 1/12 | 244/121 |
| 4,643,375 A * | 2/1987 | Allen | B64G 1/46 | 244/171.9 |
| 4,730,797 A * | 3/1988 | Minovitch | B64G 9/00 | 244/158.3 |
| 4,735,382 A * | 4/1988 | Pinson | B64G 1/426 | 244/150 |
| 4,792,108 A * | 12/1988 | Bull | B64G 9/00 | 244/159.4 |
| 4,807,833 A * | 2/1989 | Pori | B64G 1/12 | 220/560.1 |
| 4,878,637 A * | 11/1989 | Mullen | B64G 1/12 | 244/159.4 |
| 5,086,999 A * | 2/1992 | Mullen | B64G 1/12 | 244/159.4 |
| 5,235,788 A * | 8/1993 | Maimets | B64G 4/00 | 244/172.6 |
| 5,302,130 A * | 4/1994 | Sieving | B64G 1/46 | 244/171.8 |
| 5,580,013 A * | 12/1996 | Velke | B64G 1/12 | 135/123 |
| 6,045,094 A * | 4/2000 | Rivera | B64G 1/12 | 244/159.4 |
| 6,206,328 B1 * | 3/2001 | Taylor | B64G 1/12 | 244/159.6 |
| 6,216,984 B1 * | 4/2001 | Brinsmade | B64G 1/12 | 244/159.4 |
| 6,439,508 B1 * | 8/2002 | Taylor | B64G 1/12 | 244/158.3 |
| 6,523,782 B2 * | 2/2003 | Barutt | B64G 1/60 | 244/171.9 |
| 6,547,189 B1 * | 4/2003 | Raboin | B64G 1/12 | 244/158.3 |
| 7,988,096 B2 * | 8/2011 | Humphries | B64G 1/1078 | 244/158.1 |
| 8,038,541 B1 * | 10/2011 | Solomon | A63G 1/00 | 472/1 |
| 8,070,105 B2 * | 12/2011 | Johnson | B64G 1/12 | 244/158.3 |
| 8,474,760 B2 * | 7/2013 | Leventhal | F16M 13/00 | 244/159.4 |
| 8,931,741 B1 * | 1/2015 | Kilchichakov | B64G 7/00 | 244/159.4 |
| 9,090,361 B2 * | 7/2015 | Clay | B64G 1/14 | |
| 9,359,091 B2 * | 6/2016 | Biddlecom | B64G 1/46 | |
| 2002/0074457 A1 * | 6/2002 | Barutt | B64G 1/12 | 244/171.9 |
| 2006/0163434 A1 * | 7/2006 | Patel | B64G 1/10 | 244/158.3 |
| 2007/0063104 A1 * | 3/2007 | Humphries | B64G 1/1078 | 244/158.1 |
| 2009/0302166 A1 * | 12/2009 | Meyers | B64G 1/002 | 244/158.9 |
| 2010/0263167 A1 * | 10/2010 | Fox | F16F 7/104 | 16/400 |
| 2013/0287984 A1 * | 10/2013 | Kemp | B64G 1/22 | 428/36.9 |
| 2014/0124626 A1 * | 5/2014 | Clay | B64G 1/14 | 244/159.3 |
| 2015/0108280 A1 * | 4/2015 | Willard, Jr. | B64G 1/46 | 244/171.9 |
| 2015/0329223 A1 * | 11/2015 | Biddlecom | B64G 1/46 | 244/171.9 |

* cited by examiner

EXPANDABLE GRAVITY CHAMBER FOR A HABITATION MODULE THAT IS HOUSED IN AN INFLATABLE SHELL

FIELD

This disclosure relates to the field of habitation modules that provide artificial gravity environments.

BACKGROUND

When humans occupy a space station, they encounter a zero-gravity environment or "weightless" environment. Extended exposure to a zero-gravity environment can be detrimental to the health of the human occupants, such as muscle and bone degeneration. To avoid these long-term health effects, artificial gravity environments may be installed in the space station. One way to create artificial gravity is with centrifugal force, where a vessel rotates at a speed that drives a human occupant inside of the vessel toward the outer hull of the vessel. The force on the human occupant feels like a gravitational pull.

Because of the health benefits and comfort of artificial gravity, it is desirable to design improved artificial gravity environments for space habitats/vehicles.

SUMMARY

Embodiments described herein include a habitation module for a space station or the like that includes a gravity chamber for human occupancy. The gravity chamber is collapsible for transport into space. When in space, the gravity chamber is expanded for use by crew members. Therefore, the gravity chamber is able to fit in the payload of a space vehicle (e.g., a space shuttle) during transport, and is able to expand to a desired size for use on a space station or the like. When expanded, a drive mechanism rotates the gravity chamber on the support bearings about an axis to simulate a gravitational force within the gravity chamber. Artificial gravity is therefore created within the gravity chamber.

In one embodiment, the drive mechanism directly drives one or both of the support bearings. For instance, the outer race of a support bearing may include teeth that mesh with a drive gear of the drive mechanism. Therefore, the drive mechanism is able to directly drive the gravity chamber (i.e., rotate the gravity chamber about the axis) without direct contact with the inner cylindrical structure (or inner cylindrical wall) or the outer cylindrical wall. Thus, the drive mechanism will create very little noise within the gravity chamber.

A gravity chamber as described herein may be used as a walking, jogging, or running track, where crew members are able to exercise in an artificial gravity environment. An artificial gravity exercise track is an improvement over treadmills and the like that are presently used in zero-gravity environments. Also, exercise in artificial gravity as compared to zero-gravity provides health benefits for the crew members, such as reduced muscle and bone degeneration.

A gravity chamber may be used for or reconfigured into resting areas, such as a restroom, bedroom, office, etc. Using a gravity chamber in this manner has benefits for the crew members, such as sleeping in a horizontal position, sitting in normal postures for work, etc.

One embodiment comprises a habitation module that includes a gravity chamber. The gravity chamber includes an inner cylindrical structure that encircles a cylindrical core member of the habitation module, outer wall segments that are attachable to one another to form an outer cylindrical wall, and opposing side walls having support members that are extendable. The first end of the support members connects to the inner cylindrical structure, and a second end of the support members connects to at least one of the outer wall segments. The gravity chamber has a first diameter when the support members are contracted, and has a larger second diameter when the support members are extended. The habitation module further includes rotating attachment members for attaching the gravity chamber to the cylindrical core member of the habitation module so that the gravity chamber rotates about an axis in relation to the cylindrical core member to simulate a gravitational force within the gravity chamber. The habitation module further includes an inflatable shell that encompasses the gravity chamber.

In another embodiment, the outer wall segments connect to one another to assemble a continuous cylindrical structure that comprises the outer cylindrical wall of the gravity chamber when the support members are extended.

In another embodiment, the rotating attachment members comprise support bearings for attaching the gravity chamber to the cylindrical core member of the habitation module. The support bearings each include an inner race attached to the cylindrical core member of the habitation module, and an outer race attached to the gravity chamber.

In another embodiment, the habitation module further includes a drive mechanism rotates the gravity chamber on the support bearings about the axis to create the gravitational force within the gravity chamber.

In another embodiment, one of the support bearings includes teeth on the outer race, and the drive mechanism includes a drive gear having teeth that mesh with the teeth on the outer race. The drive mechanism is configured to spin the drive gear to impart rotational movement to the outer race.

In another embodiment, a pair of support bearings is spaced axially along the cylindrical core member, and attaches to opposing sides of the gravity chamber.

In another embodiment, the habitation module further includes a cylindrical counter-weight member that rotates about the axis in an opposite direction than the gravity chamber.

In another embodiment, the cylindrical counter-weight member comprises a counter-weight and support bearings for attaching the counter-weight to the cylindrical core member. Each of the support bearings includes an inner race attached to the cylindrical core member, and an outer race attached to the counter-weight.

In another embodiment, the habitation module further includes a drive mechanism that drives the outer race of at least one of the support bearings to rotate the counter-weight in an opposite direction about the axis.

In another embodiment, the gravity chamber is hollow between the inner cylindrical structure, the outer cylindrical wall, and the side walls. The inner surface of the outer cylindrical wall is lined with a material for an exercise track.

In another embodiment, the gravity chamber includes a plurality of partitions that extend radially from the inner cylindrical structure to the outer cylindrical wall to define compartments within the gravity chamber.

In another embodiment, the inflatable shell includes at least one layer of fabric that is sealed around a circumference of the habitation module on opposing sides of the gravity chamber to encompass the gravity chamber in an airtight cavity.

In another embodiment, the at least one layer of fabric includes a resin (e.g., an Ultraviolet (UV)-curable resin) that cures after the inflatable shell is inflated.

In another embodiment, the habitation module further includes stabilizer members on either side of the gravity chamber. The stabilizer members have a first end that attaches to the habitation module, and a second end that includes a rolling member that contacts a side wall of the gravity chamber when the gravity chamber shifts laterally.

Another embodiment comprises a habitation module that includes a pair of gravity chambers. Each gravity chamber includes an inner cylindrical structure that encircles a cylindrical core member of the habitation module, outer wall segments that are attachable to one another to form an outer cylindrical wall, and opposing side walls having support members that are extendable. A first end of the support members connects to the inner cylindrical structure, and a second end of the support members connects to at least one of the outer wall segments. Each gravity chamber has a first diameter when the support members are contracted, and has a larger second diameter when the support members are extended. The habitation module further includes rotating attachment members for attaching each of the gravity chambers to the cylindrical core member of the habitation module. The first gravity chamber rotates about an axis in relation to the cylindrical core member to simulate a gravitational force within the first gravity chamber and the second gravity chamber rotates in an opposite direction about the axis to simulate a gravitational force within the second gravity chamber. The habitation module further includes an inflatable shell that encompasses the gravity chambers.

Another embodiment comprises a habitation module having a hull that defines an outer diameter of the habitation module, and having a cylindrical core member encapsulated by the hull that extends through a center of the habitation module. The habitation module further includes a gravity chamber that includes an inner cylindrical structure that encircles the cylindrical core member of the habitation module, outer wall segments that are attachable to one another to form an outer cylindrical wall, and opposing side walls having support members that are extendable. A first end of the support members connects to the inner cylindrical structure, and a second end of the support members connects to at least one of the outer wall segments. The outer wall segments connect to one another to assemble a continuous cylindrical structure that comprises the outer cylindrical wall of the gravity chamber when the support members are extended. The habitation module further includes rotating attachment members for attaching the gravity chamber to the cylindrical core member of the habitation module so that the gravity chamber rotates about an axis in relation to the cylindrical core member to simulate a gravitational force within the gravity chamber. The habitation module further includes an inflatable shell that is sealed to the hull to enclose the gravity chamber, wherein the inflatable shell distends beyond the outer diameter of the hull.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
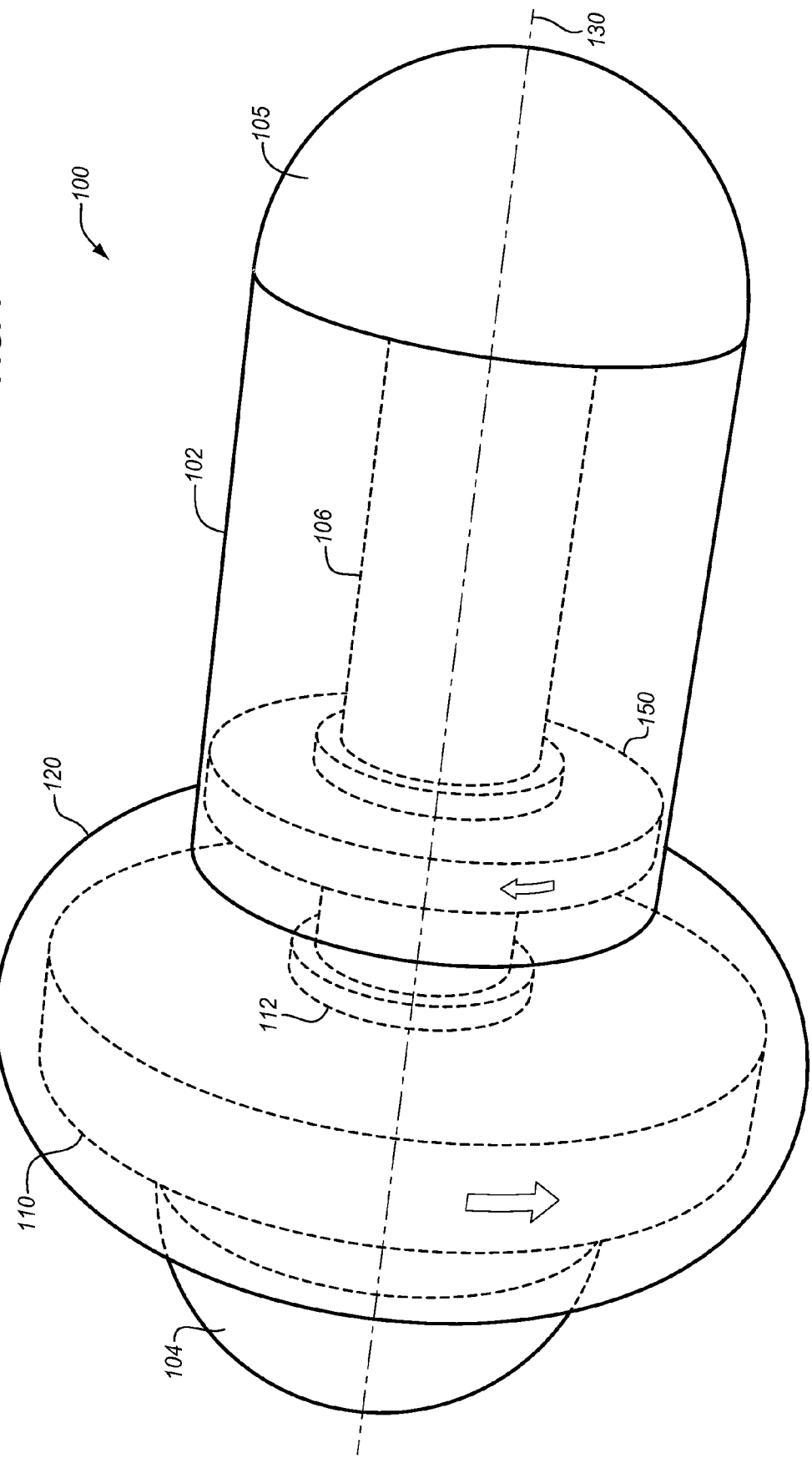
FIG. 1 illustrates a habitation module in an exemplary embodiment.

FIG. 1 illustrates a habitation module 100 in an exemplary embodiment. Habitation module (HAB) 100 is a module used for living quarters for crew members of a space station, such as the International Space Station. For example, HAB 100 may be used for sleeping quarters, restroom facilities, medical facilities, exercise facilities, etc. HAB 100 is configured for space vehicles in Low-Earth Orbit (LEO) or Beyond Low-Earth Orbit (BLED).

HAB 100 is illustrated as a cylindrical capsule with a hull 102 that encapsulates the modules and systems of HAB 100. Hull 102 is the rigid outer body or fuselage of HAB 100 that defines its outer diameter during transport, which may be about 8.4 meters. The outer diameter of HAB 100 may be limited by the size of the launch vehicle used to transport HAB 100 into space. For example, a Space Launch System (SLS) from NASA may be used to transport HAB 100 into space, and the outer diameter of HAB 100 may be constrained by the size of the SLS. Although not shown in FIG. 1, at least a portion of the interior of hull 102 may be pressurized and supplied with oxygen. Either (or both) of the ends 104-105 of hull 102 may be attached to other modules of a space station. The structure of HAB 100 also includes a cylindrical core member 106 that extends through a center of HAB 100. The diameter of cylindrical core member 106 may be about 4.3 meters. The structure of HAB 100 also includes a cylindrical core member 106 that extends through a center of HAB 100. The diameter of cylindrical core member 106 may be about 4.3 meters.

In order to provide an artificial gravity environment for the crew members, HAB 100 is equipped with one or more gravity chambers 110 that rotate about an axis 130. Gravity chamber 110 rotates at a speed to create an artificial gravity environment by simulating gravitational forces. For example, gravity chamber 110 may rotate at 8 rpm, 10 rpm, 12 rpm, etc., to create an artificial gravity environment. Gravity chamber 110 attaches to cylindrical core member 106 by rotating attachment members 112, which allow gravity chamber 110 to rotate in relation to cylindrical core member 106. As will be described in more detail below, HAB 100 may further include a counter-weight member 150 that rotates in the opposite direction as gravity chamber 110.

Gravity chamber 110 is able to contract in shape for transport into space, and then expand beyond the diameter of hull 102 when in space for use by the crew members. Gravity chamber 110 is encompassed or enclosed by an inflatable shell 120. Inflatable shell 120 is made from one or more layers of material, such as insulation layers, protection layers, etc. Inflatable shell 120 is sealed around a circumference of hull 102 (as shown in FIG. 1) or another portion of HAB 100 on opposing sides of gravity chamber 110 to encompass gravity chamber 110 in an airtight cavity. When in space, inflatable shell 120 is filled with air or gas so that it becomes distended. Inflatable shell 120 remains inflated or pressurized while in use so that gravity chamber 110 may rotate within inflatable shell 120. In one embodiment, a resin may be infused into one or more layers of inflatable shell 120 to cure in space. For example, an Ultraviolet (UV)-curable resin may be infused into one or more layers of inflatable shell 120 that cures or hardens when exposed to a specific light spectrum from the Sun.

Figure 2:
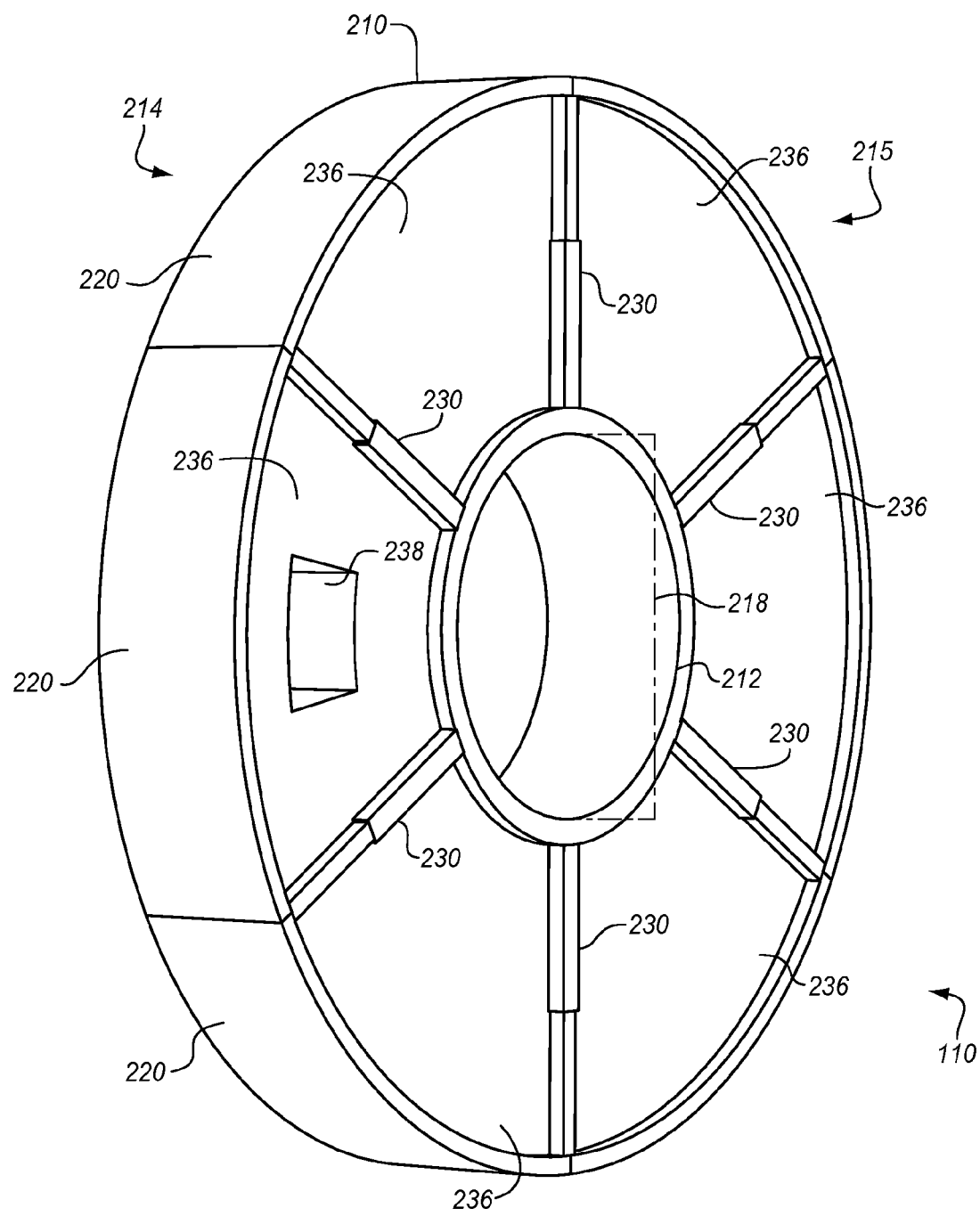
FIG. 2 illustrates a gravity chamber of a habitation module in an exemplary embodiment.

FIG. 2 illustrates gravity chamber 110 of HAB 100 in an exemplary embodiment. The view in FIG. 2 is when gravity chamber 110 is expanded to its desired diameter. When expanded, gravity chamber 110 is annular or ring-shaped, and has an outer cylindrical wall 210 that defines the outer diameter of gravity chamber 110, an inner cylindrical structure 212 that defines an inner diameter of gravity chamber 110, and opposing side walls 214-215. Outer cylindrical wall 210 is the outermost cylindrical surface of gravity chamber 110 when it is expanded. To allow gravity chamber 110 to contract and expand, outer cylindrical wall 210 is formed from outer wall segments 220 that are attachable to one another to form outer cylindrical wall 210. Outer wall segments 220 may be made from a thin metal, a composite material, a plastic, or another type of rigid material. Outer wall segments 220 may be detached from one another when gravity chamber 110 is contracted into a smaller shape for transport. When gravity chamber 110 is expanded to its larger shape for operations, outer wall segments 220 may be attached to one another so that outer cylindrical wall 210 is a continuous member or surface.

Inner cylindrical structure 212 is the structure for attaching gravity chamber 110 to cylindrical core member 106 of HAB 100 (see FIG. 1). Inner cylindrical structure 212 may comprise a cylindrical wall made from a material, such as a thin metal, a composite material, a plastic, or another type of rigid material. Inner cylindrical structure 212 may additionally or alternatively comprise a frame with surfaces, ribs, support members, etc., for attaching gravity chamber 110 to cylindrical core member 106. Due to its cylindrical shape, inner cylindrical structure 212 has an axial hole 218 through its center that fits over cylindrical core member 106 of HAB 100. The diameter of axial hole 218 is larger than the diameter of cylindrical core member 106 so that cylindrical core member 106 is able to pass through axial hole 218. As an example, the diameter of cylindrical core member 106 may be about 4.3 meters, so the diameter of axial hole 218 would be greater than 4.3 meters in this example.

Side walls 214-215 each include a plurality of support members 230 that extend between outer cylindrical wall 210 and inner cylindrical structure 212. Support members 230 provide a rigid frame for side walls 214-215. Support members 230 may be made from aluminum, a composite material, or another type of material. For example, support members 230 may comprise 1 inch aluminum tubes with 0.049 inch walls. Support members 230 may extend radially from inner cylindrical structure 212 to outer cylindrical wall 210 as illustrated in FIG. 2, or may be angled in relation to the radial direction if desired. The number and placement of support members 230 is just an example, and may vary as desired. Support members 230 are extendable in this embodiment so that the length of support members 230 may be increased or decreased. For example, support members 230 may have a telescoping structure with concentric tubular parts of progressively smaller diameters nested within each other. Support members 230 are collapsed during transport of gravity chamber 110 to space to reduce the outer diameter of gravity chamber 110 (i.e., so it can fit in the payload of a launch vehicle), and are extended in space during normal operations.

Side walls 214-215 may also include side closures 236 that enclose the area between support members 230. Side closures 236 may be made from a soft material, such as Kevlar®, canvas, or another type of fabric. One or more entry openings 238 may be formed in side closures 236 to allow crew members to access the inside of gravity chamber 110. Entry openings 238 have a size large enough for a crew member to pass through, and may include a door and a mechanism for opening and closing the door, such as a latch, a zipper, etc.

Figure 3:
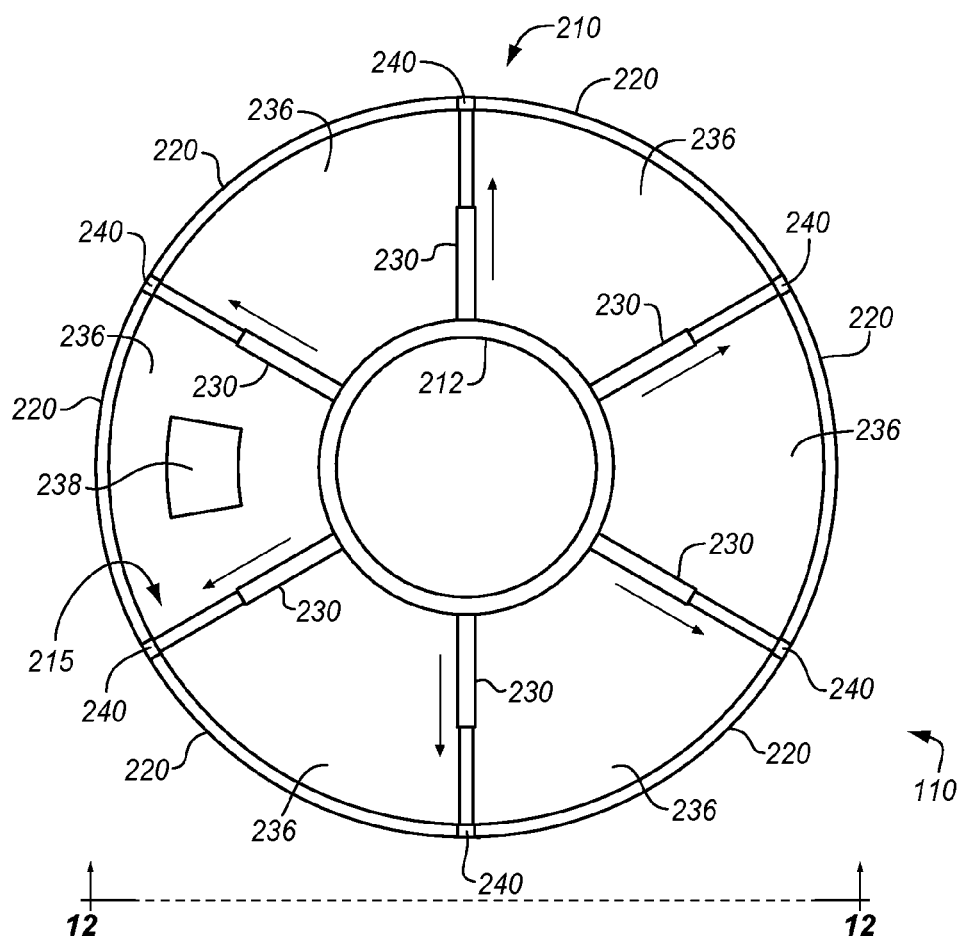
FIG. 3 is a side view of a gravity chamber with support members extended in an exemplary embodiment.

FIG. 3 is a side view of gravity chamber 110 with support members 230 extended in an exemplary embodiment. The view in FIG. 3 is of side wall 215. When support members 230 are extended, gravity chamber 110 has a desired outer diameter for operations. Outer wall segments 220 are attached to one another by an affixing member 240. Affixing member 240 may comprise a pin, bolt, hinge, or any other component that connects the outer wall segments 220 to create outer cylindrical wall 210. When fashioned as in FIG. 3, gravity chamber 110 is able to rotate to create an artificial gravity environment.

Figure 4:
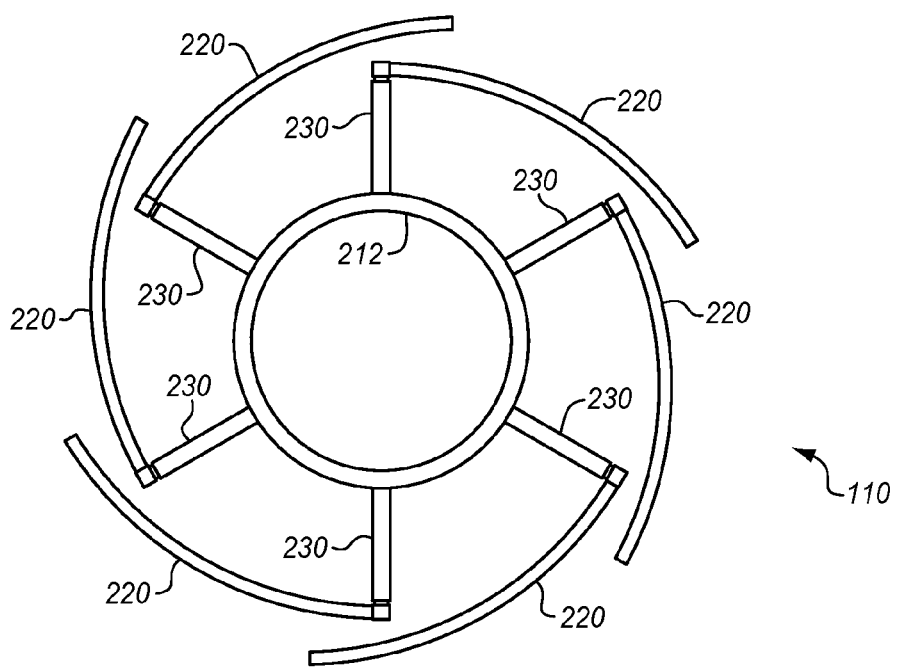
FIG. 4 is a side view of a gravity chamber with support members collapsed in an exemplary embodiment.

FIG. 4 is a side view of gravity chamber 110 with support members 230 collapsed in an exemplary embodiment. Support members 230 are collapsed in FIG. 4 to reduce the outer diameter of gravity chamber 110 for transport. Outer wall segments 220 are unattached and stacked in some manner to create a smaller profile for gravity chamber 110 so that it fits within the payload of a launch vehicle. Side closures 236 may be removed when gravity chamber 110 is collapsed, or may fold when support members 230 are collapsed.

Figure 5:
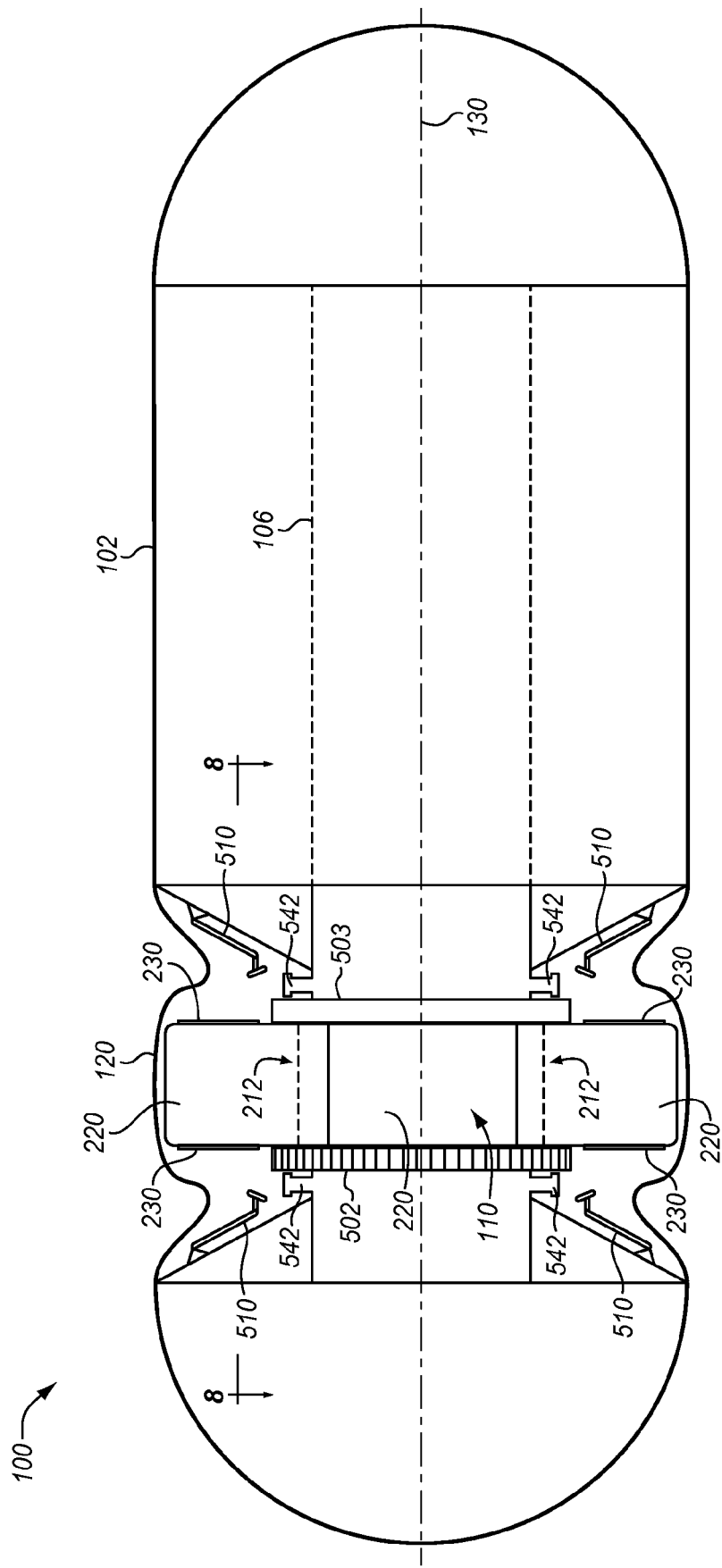
FIG. 5 is a side view of a habitation module with a gravity chamber collapsed in an exemplary embodiment.

FIG. 5 is a side view of HAB 100 with gravity chamber 110 collapsed in an exemplary embodiment. In FIG. 5, inflatable shell 120 is deflated and packed around gravity chamber 110 for transport. Support members 230 are contracted so that gravity chamber 110 is collapsed, and its outer diameter becomes small enough for transport (see also, FIG. 4). For example, the outer diameter of gravity chamber 110 may be the same as or less than the diameter of hull 102 when collapsed. Stabilizer members 510 are also shown in a folded position. The purpose of stabilizer members 510 are described in relation to FIG. 6.

FIG. 5 also illustrates that gravity chamber 110 may attach to cylindrical core member 106 through a pair of support bearings 502-503. Cylindrical core member 106 includes mounting members 542 that protrude from an outer surface of cylindrical core member 106. Mounting members 542 may comprise a ring that encircles cylindrical core member 106, or may comprise a plurality of individual members that are affixed around the circumference of cylindrical core member 106. Support bearings 502-503 attach to mounting members 542, and also attach to gravity chamber 110. The structure of support bearings 502-503 is illustrated further in FIG. 7.

Figure 6:
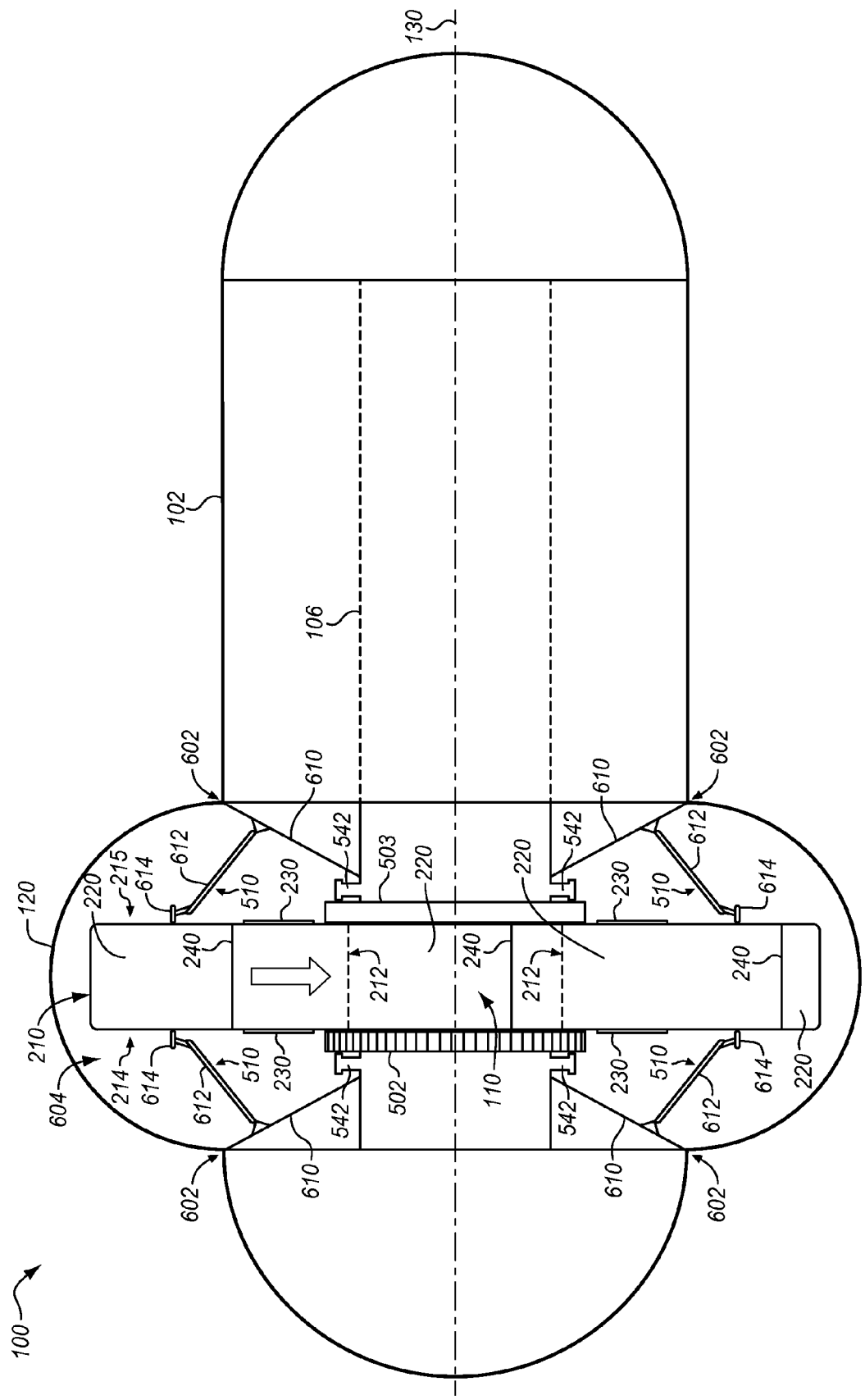
FIG. 6 is a side view of a habitation module with a gravity chamber expanded in an exemplary embodiment.

FIG. 6 is a side view of HAB 100 with gravity chamber 110 expanded in an exemplary embodiment. In FIG. 6, air or gas fills inflatable shell 120 so that it is distended. The edges 602 or ends of inflatable shell 120 are sealed to hull 102 or another portion of HAB 100 to create an airtight cavity 604 that surrounds gravity chamber 110. With inflatable shell 120 distended, support members 230 are extended so that gravity chamber 110 expands. Outer wall segments 220 are attached to one another by affixing members 240 to form the outer cylindrical wall 210 of gravity chamber 110 (see also, FIG. 3).

Stabilizer members 510 are deployed on either side of gravity chamber 110 to support the sides of gravity chamber 110. Stabilizer members 510 extend from a frame 610 of HAB 100 to a position proximate to a side wall 214-215 of gravity chamber 110. As gravity chamber 110 rotates, it may shift laterally or lean due to uneven weight distribution, movement of crew members within gravity chamber 110, etc. Each stabilizer member 510 includes an extension arm 612 with a rolling element 614 attached to extension arm 612. Extension arm 612 may extend or telescope to a desired length to position rolling element 614 proximate to a side wall 214-215 of gravity chamber 110. Rolling element 614 comprises any component that rotates in response to contacting a side wall 214-215 of gravity chamber 110, such as a wheel that connects to extension arm 612 through a bearing (e.g., a thrust bearing). Although not visible in FIG. 6, side walls 214-215 may include circular tracks for contacting the rolling elements 614 of stabilizer members 510. If gravity chamber 110 begins to lean during rotation, one or more rolling elements 614 of stabilizer members 510 will contact a side wall 214-215 of gravity chamber 110 to correct gravity chamber 110.

Figure 7A:
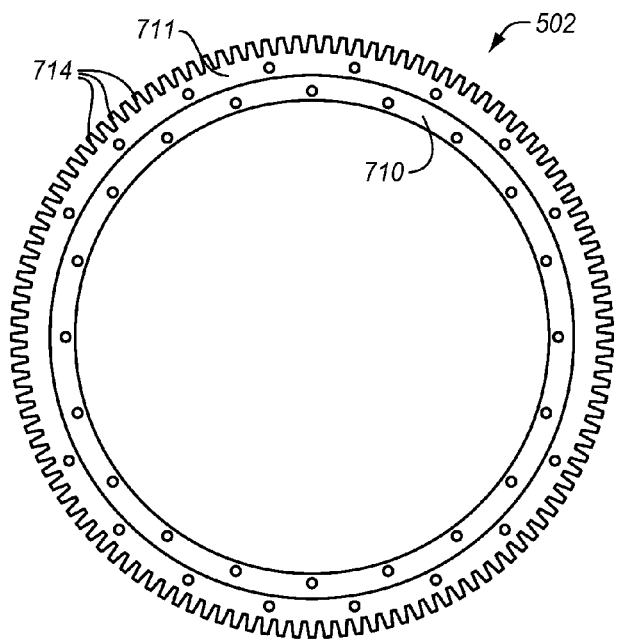
FIGS. 7A-7B illustrate support bearings in an exemplary embodiment.
Figure 7B:
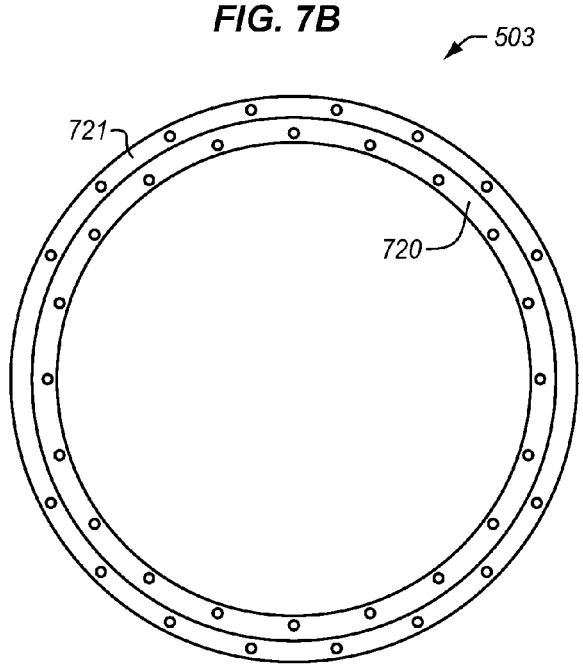

FIGS. 7A-7B illustrate support bearings 502-503 for gravity chamber 110 in an exemplary embodiment. Support bearings 502-503 are configured to attach gravity chamber 110 to cylindrical core member 106 so that gravity chamber 110 is able to rotate in relation to cylindrical core member 106 about axis 130. Support bearing 502 includes an inner race (or ring) 710, an outer race (or ring) 711, and a rolling element between inner race 710 and outer race 711 that enables rotational movement (not visible in FIG. 7A). The rolling element may comprise ball bearings, cylindrical rollers, or the like. Inner race 710 is configured to attach to cylindrical core member 106, while outer race 711 is configured to attach to gravity chamber 110 (see FIG. 5). Support bearing 502 also includes a plurality of teeth 714 on outer race 711 for meshing with a drive gear of a drive mechanism. Support bearing 503 (see FIG. 7B) has a similar structure as support bearing 502 with an inner race 720 and an outer race 721, except that its outer race 721 does not include teeth.

As shown in FIGS. 5-6, support bearings 502-503 are spaced axially along and attach to cylindrical core member 106. The use and placement of support bearings 502-503 as shown in FIGS. 5-6 is just an example and may vary as desired. For example, two support bearings 502 with teeth 714 may be used in one application. In another example, more than two support bearings 502-503 may be used.

Figure 8:
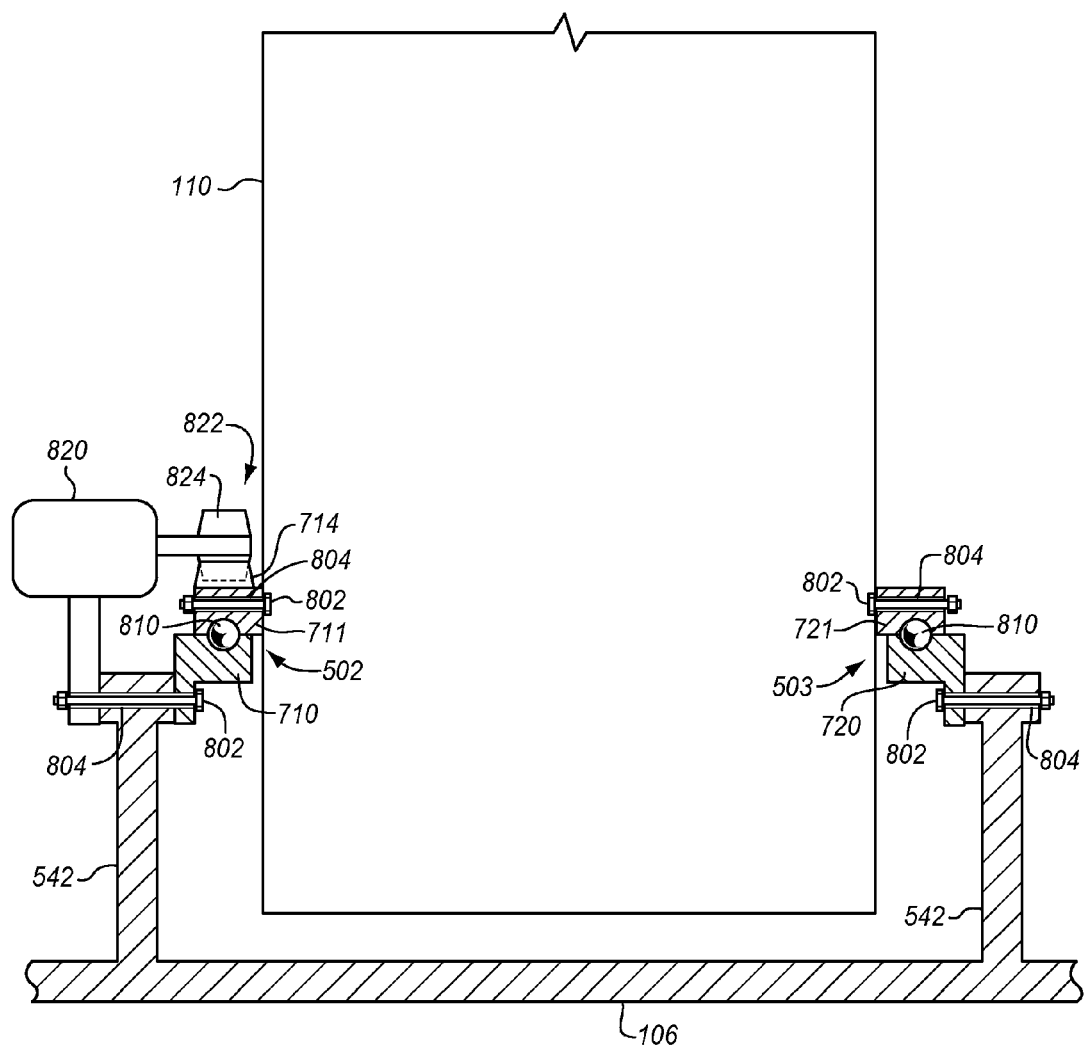
FIG. 8 illustrates attachment of a gravity chamber to a cylindrical core member in an exemplary embodiment.

FIG. 8 illustrates attachment of gravity chamber 110 to cylindrical core member 106 in an exemplary embodiment. FIG. 8 is a cross-section along line 8-8 of FIG. 5 showing attachment points of support bearings 502-503 to gravity chamber 110 (only a portion of gravity chamber 110 is shown in FIG. 8). On the left-hand side of gravity chamber 110, outer race 711 of support bearing 502 attaches to gravity chamber 110 with an attachment member 802, such as a bolt, screw, pin, etc. Outer race 711 may attach to inner cylindrical structure 212 or a side wall 214-215 of gravity chamber 110. Inner race 710 of support bearing 502 attaches to mounting member 542 with an attachment member 802. Bushings 804 (e.g., rubber bushings) may be used at the attachment point for outer race 711 and inner race 710 to absorb noise and/or vibration at the attachment point. Also shown in FIG. 8 is a rolling element 810 between inner race 710 and outer race 711 that enables rotational movement. Rolling element 810 may comprise ball bearings, cylindrical rollers, or the like.

A drive mechanism 820 is placed proximate or adjacent to outer race 711 of support bearing 502 to directly drive support bearing 502. Drive mechanism 820 is configured to spin a drive gear 822 to impart rotational movement to outer race 711. Teeth 824 on drive gear 822 mesh with teeth 714 on outer race 711 (see FIG. 7A). When drive mechanism 820 turns drive gear 822, it imparts rotational movement on gravity chamber 110 about axis 130 (see FIG. 1). Drive mechanism 820 may comprise an electric motor, a hydraulic motor, a pneumatic motor, or any other actuating device that has a variable rotational speed.

On the right-hand side of gravity chamber 110, outer race 721 of support bearing 503 attaches to gravity chamber 110 with an attachment member 802. Inner race 720 of support bearing 503 attaches to mounting member 542 with an attachment member 802. Bushings 804 may be used at the attachment point for outer race 721 and inner race 720 to absorb noise and/or vibration at the attachment point.

As shown in FIG. 8, support bearing 502 (with teeth 714) is installed on one side of gravity chamber 110, and support bearing 503 (without teeth 714) is installed on the other side of gravity chamber 110. In another embodiment, support bearing 502 (with teeth 714) may be installed on either side or both sides of gravity chamber 110. If support bearing 502 is installed on both sides, a drive mechanism will be installed on both sides of gravity chamber 110 to drive the outer race 711 of support bearing 502 from each side of gravity chamber 110.

The rotation of gravity chamber 110 about axis 130 creates a centrifugal force on objects (e.g., crew members) inside of gravity chamber 110 that pulls the objects towards outer cylindrical wall 210 (see FIG. 6). The centrifugal force feels like gravity to a crew member inside of gravity chamber 110. Because gravity chamber 110 is attached to cylindrical core member 106 through support bearings 502-503, gravity chamber 110 will rotate very smoothly. Also, drive mechanism 820 drives support bearing 502 and does not directly contact the bottom of inner cylindrical structure 212, which results in minimal noise from drive mechanism 820.

The rotation of gravity chamber 110 may also create an unwanted momentum for HAB 100. To cancel out the unwanted momentum, cylindrical counter-weight member 150 (see FIG. 1) may be installed on cylindrical core member 106 that rotates about axis 130 in an opposite direction than gravity chamber 110. The structure of counter-weight member 150 may vary as desired. In one embodiment, a counter-weight may be installed on support bearings as described below.

Figure 9:
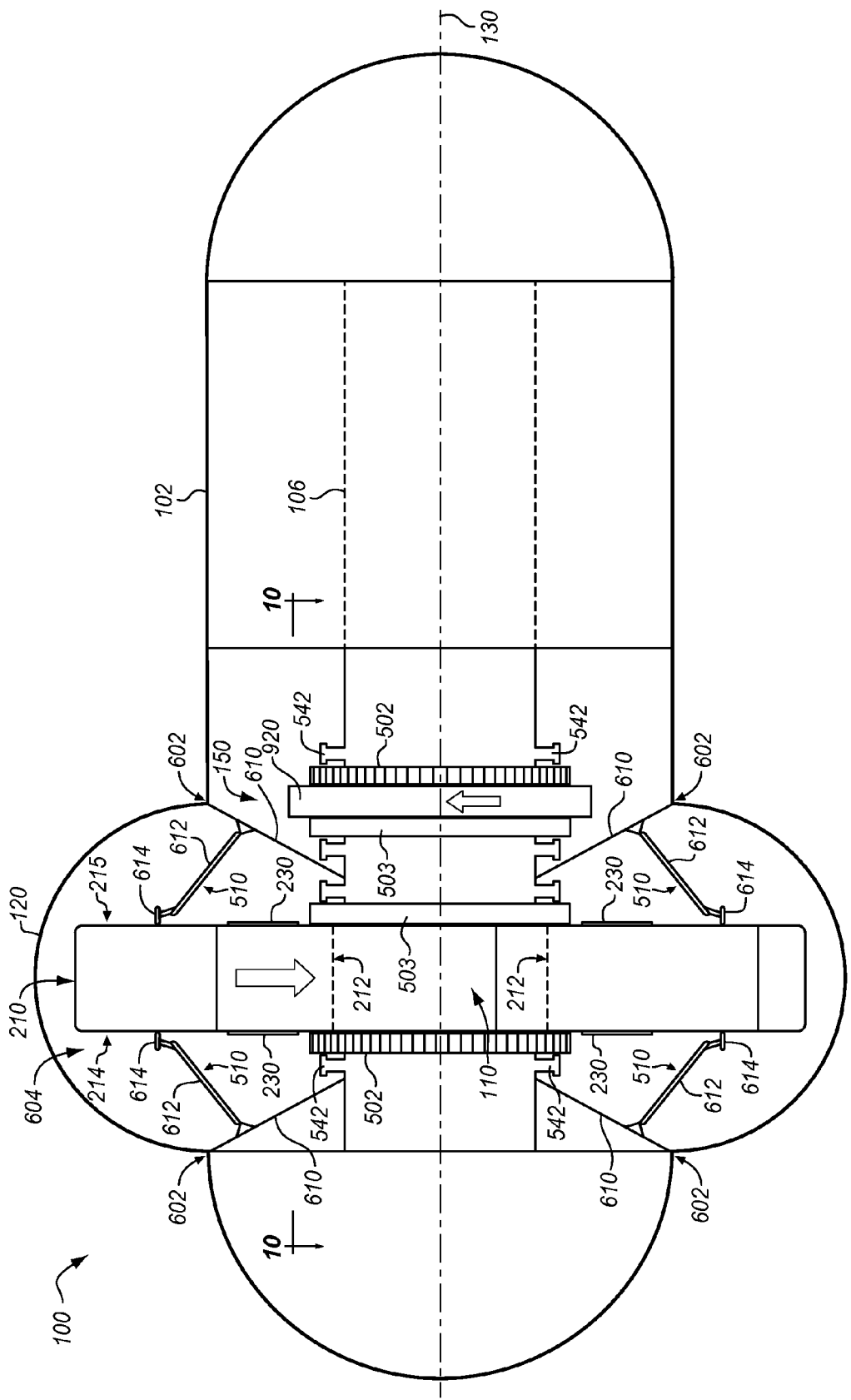
FIG. 9 illustrates a counter-weight member attached to a cylindrical core member with support bearings in an exemplary embodiment.

FIG. 9 illustrates counter-weight member 150 attached to cylindrical core member 106 with support bearings in an exemplary embodiment. Counter-weight member 150 includes a counter-weight 920 attached to cylindrical core member 106 with support bearings 502-503. Counter-weight 920 comprises any mass that is able to be rotated around cylindrical core member 106. In the embodiment shown in FIG. 9, counter-weight 920 is a ring having a diameter greater than the diameter of cylindrical core member 106. Counter-weight 920 does not have to be a continuous structure as shown in FIG. 9, but may be segmented and spaced around the circumference of cylindrical core member 106. Counter-weight 920 is driven to rotate in the opposite direction of gravity chamber 110 to negate momentum created by rotation of gravity chamber 110. Momentum is measured in mass multiplied by velocity (rotational). If it is assumed that the mass of counter-weight 920 is fixed, the counter-weight 920 is driven at a speed to compensate for the momentum created by rotation of gravity chamber 110. If the mass of gravity chamber 110 changes (e.g., a crew member enters gravity chamber 110), then the rotational speed of counter-weight 920 may be adjusted to compensate for the change in mass. The rotational speed of counter-weight 920 is therefore adjusted so that there is a net-zero momentum change due to rotation of gravity chamber 110.

Figure 10:
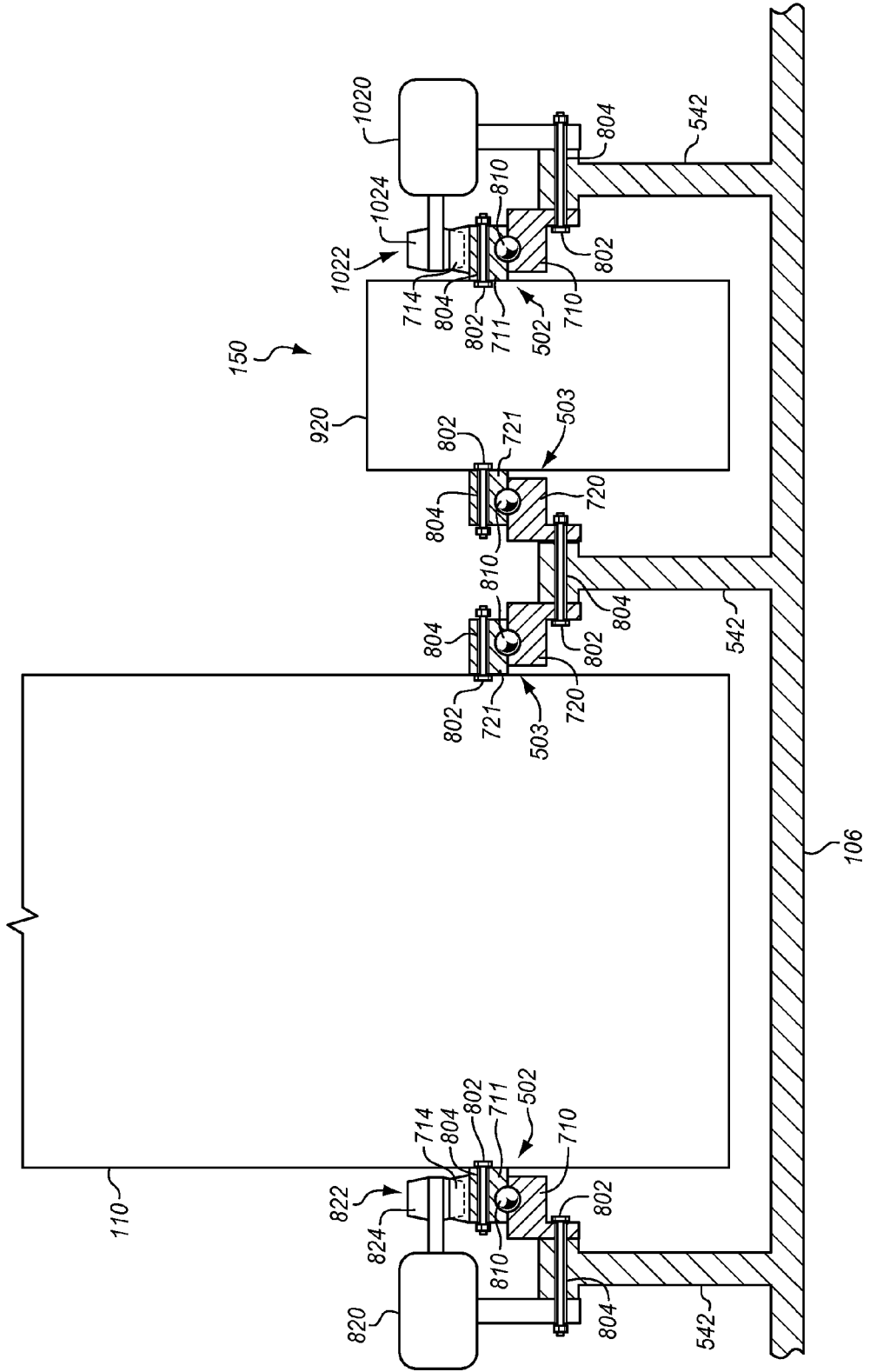
FIG. 10 illustrates attachment of a gravity chamber and a counter-weight member to a cylindrical core member in an exemplary embodiment.

FIG. 10 illustrates attachment of gravity chamber 110 and counter-weight member 150 to cylindrical core member 106 in an exemplary embodiment. FIG. 10 is a cross-section along line 10-10 of FIG. 9. The attachment of gravity chamber 110 was described in relation to FIG. 8. On the left-hand side of counter-weight member 150, outer race 721 of support bearing 503 attaches to counter-weight 920 with an attachment member 802. Inner race 720 of support bearing 503 attaches to mounting member 542 with an attachment member 802. Bushings 804 may be used at the attachment point for outer race 721 and inner race 720 to absorb noise and/or vibration at the attachment point.

On the right-hand side of counter-weight member 150, outer race 711 of support bearing 502 attaches to counter-weight 920 with an attachment member 802. Inner race 710 of support bearing 502 attaches to mounting member 542 with an attachment member 802. Bushings 804 may be used at the attachment point for outer race 711 and inner race 710 to absorb noise and/or vibration at the attachment point. A drive mechanism 1020 is placed proximate or adjacent to outer race 711 of support bearing 502 to directly drive the support bearing 502 for counter-weight 920. Drive mechanism 1020 is configured to spin a drive gear 1022 to impart rotational movement to outer race 711. Teeth 1024 on drive gear 1022 mesh with teeth 714 on outer race 711 (see FIG. 7A). When drive mechanism 1020 turns drive gear 1022, it imparts rotational movement on counter-weight 920 about axis 130 (see FIG. 1). Drive mechanism 1020 drives counter-weight 920 in an opposite direction as gravity chamber 110, and is able to adjust the speed of rotation of counter-weight to cancel any momentum created by rotation of gravity chamber 110.

Figure 11:
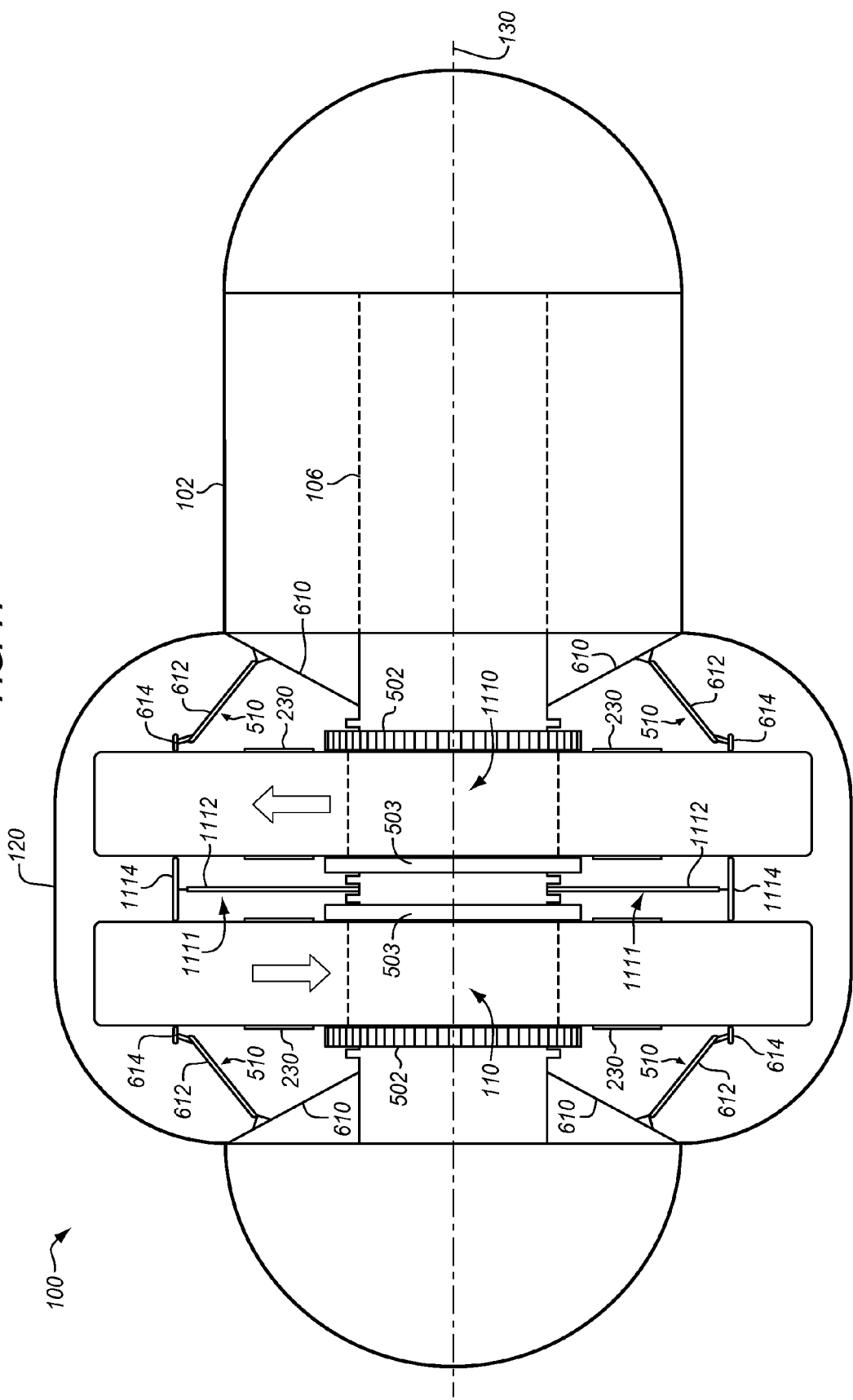
FIG. 11 illustrates a pair of gravity chambers rotating in opposition in an exemplary embodiment.

In another embodiment, counter-weight member 150 as shown in FIG. 1 may comprise a second gravity chamber that rotates in an opposite direction as gravity chamber 110. FIG. 11 illustrates a pair of gravity chambers rotating in opposition in an exemplary embodiment. In this embodiment, HAB 100 includes gravity chamber 110 as described above, and includes a second gravity chamber 1110. The structure of gravity chamber 1110 may be the same or similar as that described above, and may attach to cylindrical core member 106 in a similar manner through support bearings. For example, gravity chamber 1110 may attach to cylindrical core member 106 in a similar manner as shown in FIG. 8 with support bearings 502-503, and a drive mechanism 820 (a shared or independent drive mechanism). Gravity chamber 1110 is driven to rotate in a direction opposite of gravity chamber 110. Therefore, gravity chamber 1110 may be used to cancel any momentum created from rotation of gravity chamber 110 (or vice-versa). Stabilizer members 1111 are deployed between gravity chamber 110 and gravity chamber 1110 to support the gravity chambers 110 and 1110. Each stabilizer member 1111 includes an extension arm 1112 with a rolling element 1114 attached to extension arm 1112. Extension arm 1112 may extend or telescope to a desired length to position rolling element 1114 proximate to side walls of gravity chambers 110 and 1110.

Figure 12:
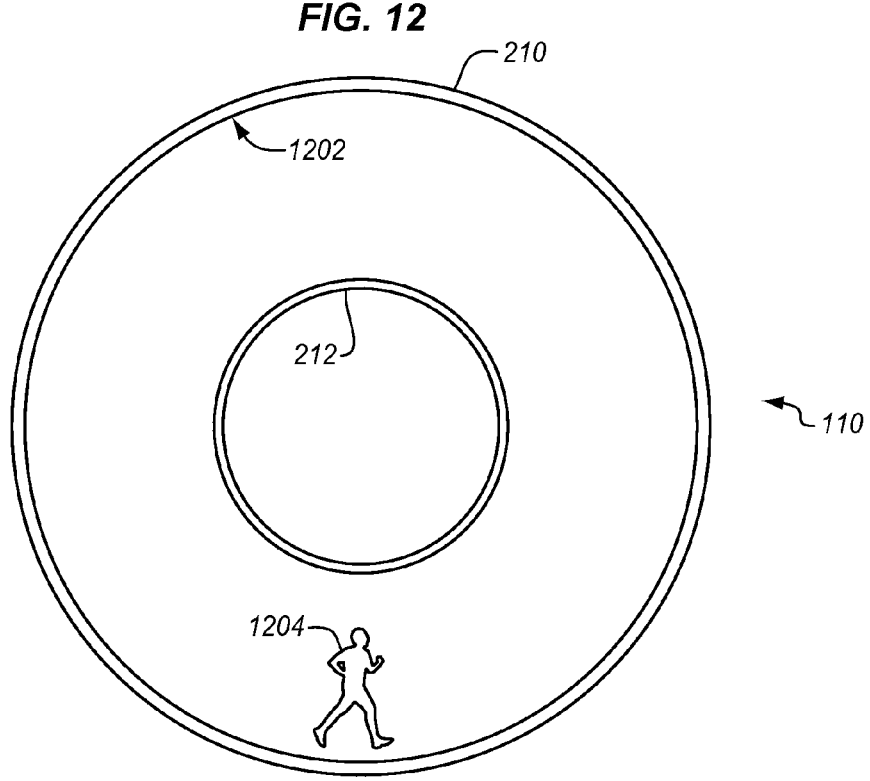
FIG. 12 illustrates an interior of a gravity chamber in an exemplary embodiment.

FIG. 12 illustrates an interior of gravity chamber 110 in an exemplary embodiment. FIG. 12 is a cross-section along line 12-12 of FIG. 3. In this embodiment, gravity chamber 110 is used for exercise activities, and therefore, may be referred to as an exercise chamber. Its interior is hollow or empty between inner cylindrical structure 212, outer cylindrical wall 210, and side walls 214-215 so that a crew member 1204 is able to walk, jog, or run within gravity chamber 110. An inner surface 1202 of outer cylindrical wall 210 may be lined with a synthetic rubber material or similar type of material for an exercise track. Thus, crew member 1204 walks, jogs, or runs on inner surface 1202 as gravity chamber 110 rotates to create an artificial gravity environment.

Figure 13:
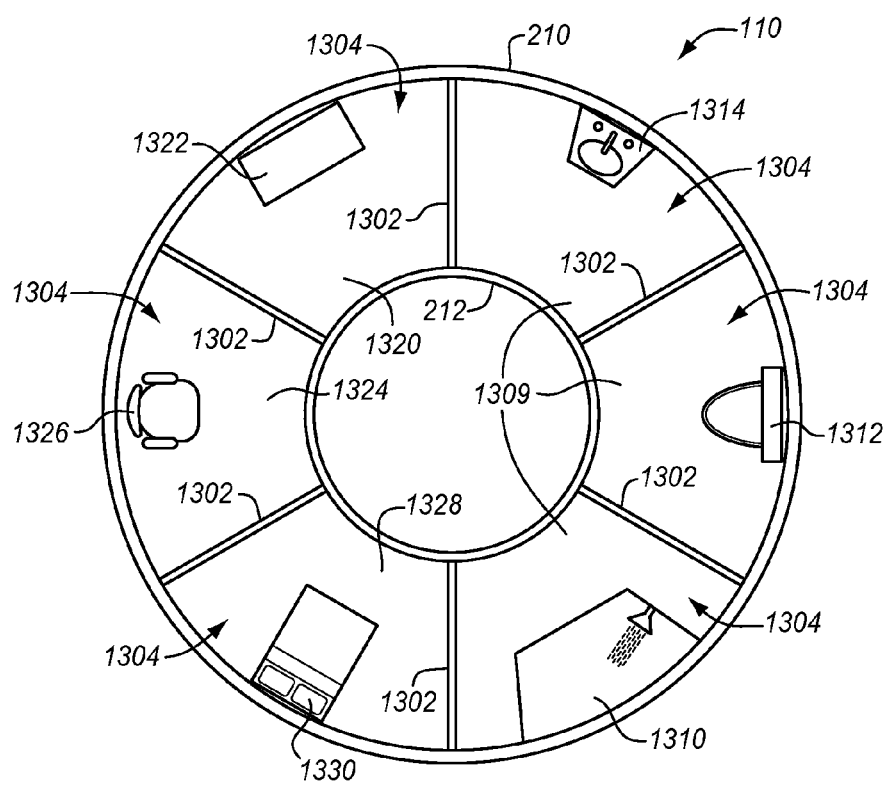
FIG. 13 illustrates an interior of a gravity chamber in an exemplary embodiment.

FIG. 13 illustrates an interior of gravity chamber 110 in another exemplary embodiment. FIG. 13 is also a cross-section along line 12-12 of FIG. 3. In this embodiment, gravity chamber 110 is compartmentalized into individual rooms. As the rooms of gravity chamber 110 may be used for rest and other activities, gravity chamber 110 may be referred to as a Rest and Activities (RAC) chamber in this embodiment. Gravity chamber 110 includes a plurality of partitions 1302 that extend radially from inner cylindrical structure 212 to outer cylindrical wall 210 to define the compartments 1304 within gravity chamber 110. Partitions 1302 may extend fully from inner cylindrical structure 212 to outer cylindrical wall 210, and from side wall 214 to side wall 215 to completely enclose compartments 1304 for privacy. Compartments 1304 may be used for a variety of purposes, such as restroom facilities 1309 having a shower 1310, a toilet 1312, and a sink 1314. A compartment 1304 may be used for office facilities 1320 having a desk 1322, chairs, cabinets, etc. A compartment 1304 may be used for lounge facilities 1324 having chairs 1326, a couch, etc. A compartment 1304 may also be used for sleeping facilities 1328 having a bed 1330.

Figure 14:
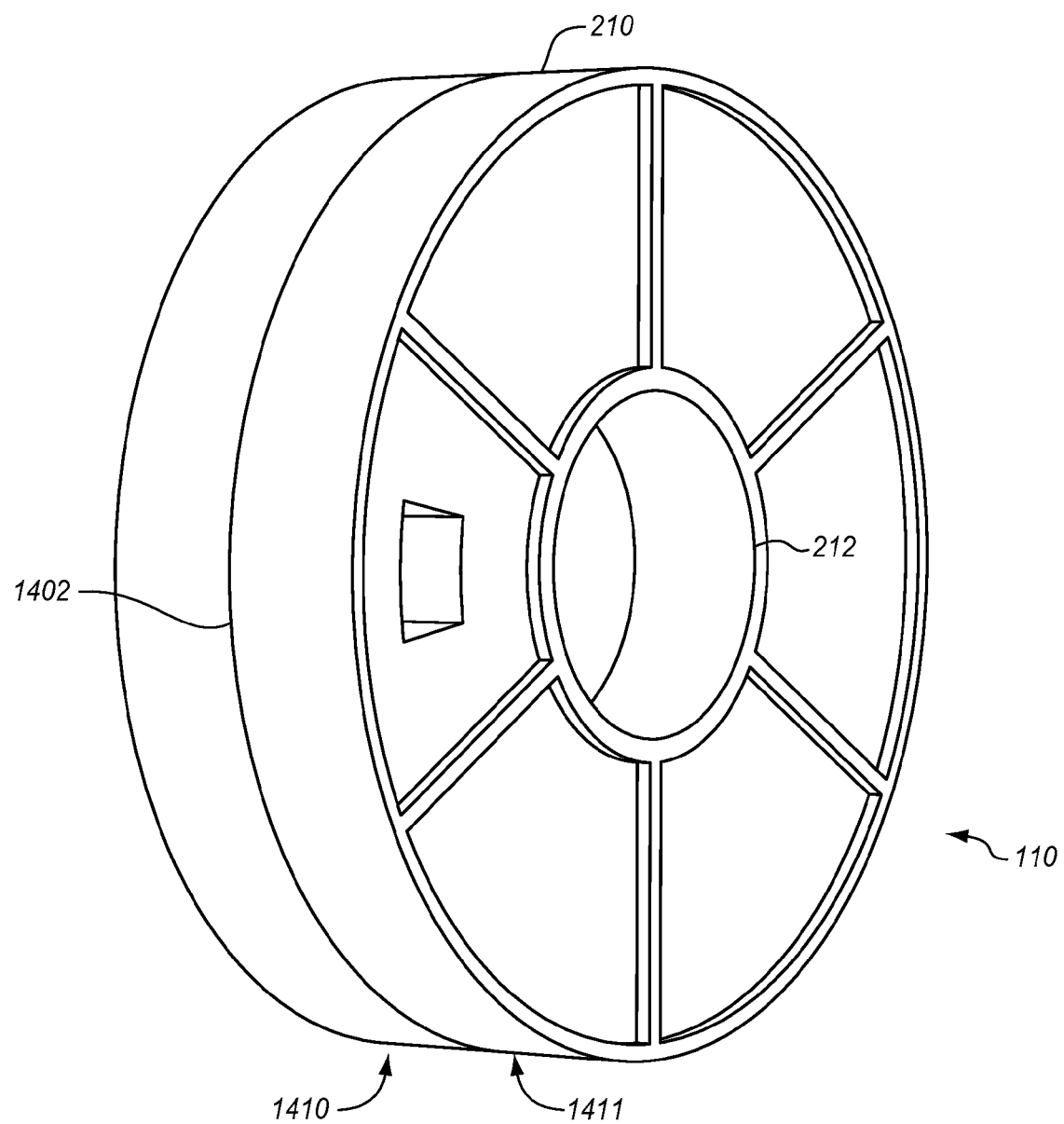
FIG. 14 illustrates a gravity chamber split into two or more annular sub-chambers in an exemplary embodiment.

FIG. 14 illustrates gravity chamber 110 split into two or more annular sub-chambers in an exemplary embodiment. In FIG. 14, gravity chamber 110 includes a divider 1402 that is orthogonal to axis 130, and divides gravity chamber 110 into annular sub-chambers 1410-1411. Sub-chamber 1410 is an exercise chamber such as shown in FIG. 12, and therefore, is hollow between inner cylindrical structure 212 and outer cylindrical wall 210. Sub-chamber 1411 is a RAC chamber, and includes a plurality of partitions that extend radially from inner cylindrical structure 212 to outer cylindrical wall 210 to define compartments within annular section 1411, such as shown in FIG. 13. Crew members are able to pass through divider 1402, such as through access openings, so that they can move freely between the RAC chamber and the exercise chamber.

Although specific embodiments were described herein, the scope is not limited to those specific embodiments. Rather, the scope is defined by the following claims and any equivalents thereof.

The invention claimed is:

1. A habitation module comprising:
    a gravity chamber comprising:
        an inner cylindrical structure that encircles a cylindrical core member of the habitation module;
        outer wall segments that are attachable to one another to form an outer cylindrical wall; and
        opposing side walls having support members that are extendable, wherein a first end of the support members connects to the inner cylindrical structure, and a second end of the support members connects to at least one of the outer wall segments;
        wherein the gravity chamber has a first diameter when the support members are contracted, and has a larger second diameter when the support members are extended;
    rotating attachment members for attaching the gravity chamber to the cylindrical core member of the habitation module so that the gravity chamber rotates about an axis in relation to the cylindrical core member to simulate a gravitational force within the gravity chamber; and
    an inflatable shell that encompasses the gravity chamber.

2. The habitation module of claim 1 wherein:
    the outer wall segments connect to one another to assemble a continuous cylindrical structure that comprises the outer cylindrical wall of the gravity chamber when the support members are extended.

3. The habitation module of claim 1 wherein the rotating attachment members comprise:
    support bearings for attaching the gravity chamber to the cylindrical core member of the habitation module, wherein the support bearings each include an inner race attached to the cylindrical core member of the habitation module, and an outer race attached to the gravity chamber.

4. The habitation module of claim 3 further comprising:
    a drive mechanism that rotates the gravity chamber on the support bearings about the axis to create the gravitational force within the gravity chamber.

5. The habitation module of claim 4 wherein:
    one of the support bearings includes teeth on the outer race;
    the drive mechanism includes a drive gear having teeth that mesh with the teeth on the outer race; and
    the drive mechanism is configured to spin the drive gear to impart rotational movement to the outer race.

6. The habitation module of claim 3 wherein the support bearings comprise:
    a pair of support bearings spaced axially along the cylindrical core member, and attached to opposing sides of the gravity chamber.

7. The habitation module of claim 1 further comprising:
    a cylindrical counter-weight member that rotates about the axis in an opposite direction than the gravity chamber.

8. The habitation module of claim 7 wherein the cylindrical counter-weight member comprises:
    a counter-weight; and
    support bearings for attaching the counter-weight to the cylindrical core member, wherein each of the support bearings includes an inner race attached to the cylindrical core member, and an outer race attached to the counter-weight.

9. The habitation module of claim 8 further comprising:
    a drive mechanism that drives the outer race of at least one of the support bearings to rotate the counter-weight in an opposite direction about the axis.

10. The habitation module of claim 1 wherein:
    the gravity chamber is hollow between the inner cylindrical structure, the outer cylindrical wall, and the side walls; and
    an inner surface of the outer cylindrical wall is lined with a material for an exercise track.

11. The habitation module of claim 1 wherein:
    the gravity chamber includes a plurality of partitions that extend radially from the inner cylindrical structure to the outer cylindrical wall to define compartments within the gravity chamber.

12. The habitation module of claim 1 wherein the inflatable shell includes:
    at least one layer of fabric that is sealed around a circumference of the habitation module on opposing sides of the gravity chamber to encompass the gravity chamber in an airtight cavity.

13. The habitation module of claim 12 wherein:
    the at least one layer of fabric includes a resin that cures after the inflatable shell is inflated.

14. The habitation module of claim 13 wherein:
    the resin comprises an Ultraviolet (UV)-curable resin.

15. The habitation module of claim 1 further comprising:
    stabilizer members on either side of the gravity chamber;
    the stabilizer members having a first end that attaches to the habitation module, and a second end that includes a rolling member that contacts a side wall of the gravity chamber when the gravity chamber shifts laterally.

16. A habitation module comprising:
    a pair of gravity chambers, where each gravity chamber includes:
        an inner cylindrical structure that encircles a cylindrical core member of the habitation module;
        outer wall segments that are attachable to one another to form an outer cylindrical wall; and
        opposing side walls having support members that are extendable, wherein a first end of the support members connects to the inner cylindrical structure, and a second end of the support members connects to at least one of the outer wall segments;
        wherein each gravity chamber has a first diameter when the support members are contracted, and has a larger second diameter when the support members are extended;
    rotating attachment members for attaching each of the gravity chambers to the cylindrical core member of the habitation module, wherein the first gravity chamber rotates about an axis in relation to the cylindrical core member to simulate a gravitational force within the first gravity chamber and the second gravity chamber rotates in an opposite direction about the axis to simulate a gravitational force within the second gravity chamber; and an inflatable shell that encompasses the gravity chambers.

17. The habitation module of claim 16 wherein the inflatable shell includes:

at least one layer of fabric that is sealed around a circumference of the habitation module on opposing sides of the gravity chambers to encompass the gravity chambers in an airtight cavity.

18. The habitation module of claim 16 wherein:

the outer wall segments of each gravity chamber connect to one another to assemble a continuous cylindrical structure that comprises the outer cylindrical wall of the gravity chamber when the support members are extended.

19. The habitation module of claim 16 wherein the rotating attachment members comprise:

support bearings for attaching the gravity chambers to the cylindrical core member of the habitation module, wherein the support bearings each include an inner race attached to the cylindrical core member of the habitation module, and an outer race attached to one of the gravity chambers.

20. An apparatus comprising:

a habitation module having a hull that defines an outer diameter of the habitation module, and having a cylindrical core member encapsulated by the hull that extends through a center of the habitation module;

a gravity chamber that includes:

an inner cylindrical structure that encircles the cylindrical core member of the habitation module;

outer wall segments that are attachable to one another to form an outer cylindrical wall; and opposing side walls having support members that are extendable, wherein a first end of the support members connects to the inner cylindrical structure, and a second end of the support members connects to at least one of the outer wall segments;

wherein the outer wall segments connect to one another to assemble a continuous cylindrical structure that comprises the outer cylindrical wall of the gravity chamber when the support members are extended;

rotating attachment members for attaching the gravity chamber to the cylindrical core member of the habitation module so that the gravity chamber rotates about an axis in relation to the cylindrical core member to simulate a gravitational force within the gravity chamber; and an inflatable shell that is sealed to the hull to enclose the gravity chamber, wherein the inflatable shell distends beyond the outer diameter of the hull.

* * * * *